United States Patent Office 3,344,132
Patented Sept. 26, 1967

3,344,132
WATER-INSOLUBLE 4-HYDROXY COUMARIN MONOAZO DYESTUFFS
Hans-Samuel Bien and Klaus Wunderlich, Leverkusen, and Fritz Baumann, Opladen, Germany, assignors to Farbenfabriken Bayer Aktiengesellschaft, Leverkusen, Germany, a corporation of Germany
No Drawing. Filed Feb. 11, 1964, Ser. No. 343,931
Claims priority, application Germany, Feb. 22, 1963, F 39,087; Dec. 27, 1963, F 41,642
9 Claims. (Cl. 260—152)

The present invention relates to novel monoazo dyestuffs; more particularly it relates to valuable water-insoluble monoazo dyestuffs of the formula

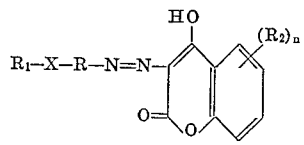

(I)

In this formula $R_1$ stands for an alkyl or aryl residue or for an optionally alkyl substituted amino group, or if X means a —OC— group $R_1$ may also stand for an alkoxy group; X means a —OC— or —$O_2$S— bridge member; $R_2$ stands for hydrogen or a non-ionic substituent; R stands for a residue of the benzene series and $n$ means an integer. The dyestuffs of the Formula I are free of sulfonic acid and carboxylic acid groups but may contain the non-ionic substituents usual in monoazo dispersion dyestuffs.

Preferred dyestuffs of Formula I are those of Formula Ia:

(Ia)

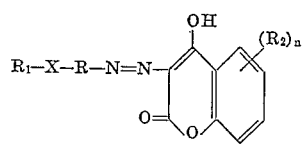

wherein X stands for a member selected from the class consisting of —OC— and —$O_2$S—; R stands for phenylene, or phenylene substituted with lower alkyl, lower alkoxy, fluorine, chlorine, bromine, trifluoromethyl, or nitro; when X is —$O_2$S—, $R_1$ means a member taken from the class consisting of lower alkyl, amino, lower alkyl substituted amino, hydroxy lower alkyl substituted amino, lower alkoxyalkyl substituted amino, phenyl, benzyl, and phenyl substituted with lower alkyl, lower alkoxy, halogen, nitro, cyano, sulfone or methyl mercapto; and when X is —OC—, $R_1$ means a member taken from the class consisting of lower alkyl, amino, lower alkyl substituted amino, hydroxy lower alkyl substituted amino, lower alkoxyalkyl, substituted amino, phenyl, benzyl, lower alkoxy, cyano substituted lower alkoxy, lower alkoxy substituted lower alkoxy, hydroxy lower alkoxy, lower alkoxy, phenyl substituted with lower alkyl, lower alkoxy, halogen, nitro, cyano, sulfone or methyl mercapto; $R_2$ stands for a member taken from the class consisting of hydrogen, lower alkyl, fluorine, chlorine, bromine, lower alkoxy and phenyl, and $n$ stands for an integer ranging from 1 to 2; the dyestuff being free of sulfonic acid and carboxylic acid groups.

Other preferred dyestuffs of Formula I are those of Formula Ib:

(Ib)

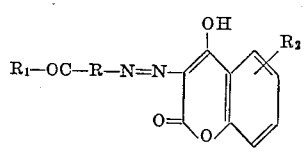

wherein $R_1$ stands for a lower alkoxy group, R stands for phenylene, or phenylene substituted with lower alkyl, lower alkoxy, fluorine, chlorine, bromine, trifluoromethyl, or nitro and $R_2$ stands for a member selected from the class consisting of hydrogen and lower alkyl; the dyestuff being free of sulfonic acid and carboxylic acid groups.

Still other preferred dyestuffs of Formula I are those of Formula Ic:

(Ic)

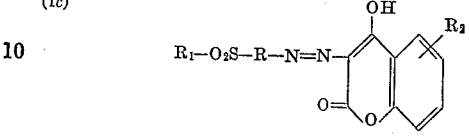

wherein $R_1$ stands for a lower alkyl group, R stands for phenylene or phenylene substituted with lower alkyl, lower alkoxy, fluorine, chlorine, bromine, trifluoromethyl, or nitro and $R_2$ stands for a member selected from the class consisting of hydrogen and lower alkyl; the dyestuff being free of sulfonic acid and carboxylic acid groups.

It is an object of the invention to provide valuable new monoazo dyestuffs; another object is the provision of valuable dyestuffs of the Formula I which are particularly suitable in form of a dispersion for the dyeing and printing of hydrophobic textile materials such as aromatic polyesters like polyethylene terephthalates, and of synthetic superpolyamides as well as triacetyl cellulose fibres. It is also an object of the invention to provide prints and dyeings on the said hydrophobic textile materials which are colored by the dyestuffs of Formula I and which exhibit excellent fastness properties such as fastness to light, sublimation and to wet processing.

Preferred alkyl groups $R_1$ or alkyl radicals contained in the alkyl substituted amino groups $R_1$ or in the alkoxy radical $R_1$ are those having 1 to 5 carbon atoms such as methyl, ethyl, butyl, (iso)propyl and amyl. The amino group $R_1$ may be substituted by one or two alkyl groups. Preferred aryl radicals $R_1$ are those of the benzene series which may possess non-ionic substituents such as lower alkyl, preferably methyl or ethyl, lower alkoxy, preferably methoxy or ethoxy, halogen, preferably chlorine or bromine, nitro, cyano, sulfone, optionally substituted sulfonamide and carbonamide groups as well as carboxylic acid ester substituents.

Preferred non-ionic substituents $R_2$ are lower alkyl such as methyl and ethyl, or halogen substituents such as fluorine, chlorine or bromine, and lower alkoxy such as methoxy and ethoxy, and aryl radicals such as phenyl.

The new monoazo dyestuffs of the Formula I are obtained when the diazo compound of an amine of the formula $$R_1—X—R—NH_2 \qquad (II)$$

is coupled with a 4-hydroxy-coumarin, choosing the initial components in such a manner that the final dyestuffs are free from sulfonic acid and carboxylic acid groups.

In Formula II $R_1$, X and R have the above indicated significance.

The coupling of the starting components is carried out in an aqueous, preferably aqueous-organic or also in an organic medium in a preferably alkaline reaction. The temperature range is generally between 0 and 40° C., preferably between 15 and 25° C.

Suitable diazo compounds to be used for the preparation of the aminoazo compounds (II) are, among others: 4-aminobenzoic acid ethyl ester, 4-aminobenzoic acid butyl ester, 3-aminobenzoic acid-(glycol-monoethyl ether)-ester, 2-aminobenzoic acid methyl ester, 4-amino-3-nitrobenzoic acid butyl ester, 4-amino-3-nitrobenzoic acid-($\beta$-cyanoethyl)-ester, 4-aminoacetophenone, 3-aminobutyrophenone, 4-aminobenzophenone, 4-amino-4'-methylmercapto-benzophenone, 3-aminobenzophenone, 4-aminobenzoic acid butylamide, 3-aminobenzoic acid dimethylamide, 4- aminobenzoic acid-γ-methoxypropylamide, 4-aminobenzoic acid-β-hydroxyethylamide, 4-amino-3-chlorobenzoic acid butyl ester, 4-amino-3-methylbenzoic acid ethyl ester, 3-amino-4-fluorobenzoic acid butyl ester, 3-aminobenzene-1-sulfonic acid-dimethylamide, 3-aminobenzene-1-sulfonic acid diethylamide, 3-aminobenzene-1-sulfonic acid ethylamide, 3-aminobenzene-1-sulfonic acid-n-butylamide, 3-aminobenzene-1-sulfonic acid-β-hydroxyethylamide, 3-aminobenzene-1-sulfonic acid amide, 2-amino-1-methoxybenzene-4-sulfonic acid amide, -methylamide, -diethylamide, 2-amino-1-methylbenzene-4-sulfonic acid dimethylamide, 3 - amino-4 - methoxybenzene-1-ethylsulfone, 2-amino-4-trifluoromethylbenzene-1-ethylsulfone, 2-amino-diphenylsulfone, 3 - amino-4-methoxydiphenylsulfone, 3-amino-4-methoxybenzene-1-benzylsulfone.

As coupling components 4-hydroxy coumarin itself may be employed or its derivatives substituted in 6-position by alkyl, such as methyl, or by halogen, such as chlorine, furthermore dialkyl substituted 4-hydroxy coumarins, such as 5,6- or 6,7-dialkyl substitution products, for example 4-hydroxy-6-methyl coumarin, 4-hydroxy-5,6-diethyl coumarin, 4-hydroxy-7,6-dimethyl coumarin, 4-hydroxy-6-bromo coumarin, 4-hydroxy-6-fluoro coumarin, 4-hydroxy-6-methoxy coumarin, 4-hydroxy-6-phenyl coumarin.

The new dyestuffs (I) are insoluble or not readily soluble in water. They are particularly suitable for dyeing and printing hydrophobic materials, such as textile materials of aromatic polyesters, especially polyethylene terephthalates, and aromatic polyesters prepared from terephthalic acid and 1,4-bis-hydroxymethyl-cyclohexene, as well as of triacetate fibres.

Colours fast to light, sublimation and wet processing are obtained on the fibrous materials, such as on polyethylene terephthalates. In mixed fabrics of polyethylene terephthalates and wool the wool constituent is essentially not dyed.

The new dyestuffs are furthermore distinguished by a good to very good affinity to the above-mentioned fibre materials.

The following examples are given for the purpose of illustrating the invention, the parts being parts by weight.

EXAMPLE 1

3.75 parts of 4-aminobenzoic acid ethyl ester are triturated with 9 parts of concentrated hydrochloric acid, the suspension is diluted with 25 parts of water and diazotized at 0–5° C. with 1.8 parts of sodium nitrite in 10 parts of water. The diazonium salt solution, freed from excess nitrous acid, is then added dropwise at 10° C. to a solution of 3.66 parts of 4-hydroxy coumarin and 10 parts of anhydrous sodium acetate in 80 parts of 50% aqueous dimethyl formamide, and the mixture is stirred overnight. After filtering with suction, washing with water and drying of the filter cake at 80° C., a yellow azo dyestuff of the formula

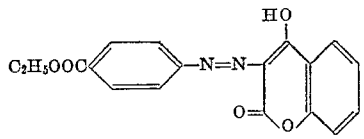

is obtained which produces on triacetate fibre material strong, brilliant, greenish-yellow shades of good fastness to light and sublimation.

Instead of 4-hydroxy coumarin there may be used in this example as coupling component equivalent quantities of 4-hydroxy-6-methyl coumarin, 4-hydroxy-5,6-dimethyl coumarin or 4-hydroxy-6,7-dimethyl coumarin, whereby dyestuffs of similar properties are obtained.

EXAMPLE 2

A diazonium salt solution is prepared from 4.48 parts of 4-aminobenzophenone analogously to Example 1; this is added dropwise at 20° C. to a solution of 4 parts of 4-hydroxy-6-methyl coumarin in 25 parts of pyridine and 40 parts of water, and the mixture is stirred at room temperature until coupling is completed. After filtering with suction, washing with water and drying the filter cake, a yellow dyestuff is obtained which dyes polyethylene terephthalate fibres in yellow shades with good fastness to sublimation and light.

If in this example there is used, instead of 4-aminobenzophenone, the equivalent quantities of 3-aminobenzophenone, 4-aminoacetophenone and 3-aminobutyrophenone and/or, instead of 4-hydroxy-6-methyl coumarin, the 4-hydroxy coumarin, valuable dyestuffs are likewise obtained which dye fabrics of aromatic polyesters in fast colours.

EXAMPLE 3

A well dispersed mixture of 5.4 parts of 4-amino-3-nitrobenzoic acid butyl ester and 2.5 parts of potassium pyrosulphite is slowly added at 0–10° C. to 30 parts of nitric acid (d. 1.48). The mixture is stirred for a half hour, diluted with ice-water at 0–5° C., the excess nitrous acid is decomposed with amido-sulphonic acid, the solution is filtered and added dropwise at 15–20° C. to a solution of 4 parts of 4-methyl-6-hydroxy coumarin in 50 parts of pyridine and 80 parts of water. The dyestuff suspension obtained is stirred overnight, filtered with suction, the filter cake is washed with water and dried at 80° C. A greenish-yellow dyestuff is obtained which draws well on polyester fibres and produces dyeing of good fastness to light and sublimation.

Instead of 4-amino-3-nitro benzoic acid butyl ester there may be employed, with the same result, the equivalent quantity of the isopropyl ester.

EXAMPLE 4

A diazonium salt solution is prepared, as described in Example 1, from 4 parts of 4-aminobenzoic acid butyl ester and added dropwise, while cold, at 10° C. to a well stirred mixture of 4 parts of 4-hydroxy-6-methyl coumarin, 10 parts of anhydrous sodim carbonate and 150 parts of water. The suspension is stirred overnight at room temperature, filtered with suction, and the filter cake obtained is washed with water and dried at 80° C. A yellow dyestuff is obtained which dyes fibres of aromatic polyesters or triacetate with good fastness to light and sublimation.

Instead of 6-methyl-4-hydroxy coumarin, there may be employed in this example as coupling component the equivalent quantity of 4-hydroxy coumarin, 4-hydroxy-5,6- and 4 - hydroxy - 6,7 - dimethyl coumarin. As diazo components, equivalent quantities of 4-amino-benzoic-acid-(glycolmonoethyl ether) ester and the corresponding 3-aminobenzoic acid derivatives may also be used. $Na_2CO_3$ can be replaced by $K_2CO_3$. In all these cases insoluble dyestuffs are attained, which yield dyeings of good fastness properties on polyethylene terephthalate fibres or on fibres of triacetate.

EXAMPLE 5

10 parts of skein material of cellulose triacetate are dyed in a bath containing 400 parts of water, 0.2 part of one of the finely dispersed dyestuffs of the Examples 1 to 4, 3.4 parts of a mixture of o-, m- and p-cresotic acid methyl ester and 0.6 part of a mixture of equal parts of aralkyl sulphonate and a non-ionic polyglycol ether, for one hour at 96–98° C., after adjusting the pH with formic acid to 4.5.

EXAMPLE 6

10 parts of skein material of polyethylene terephthalate are dyed in a bath consisting of 400 parts of water, 0.1 part of one of the finely dispersed dyestuffs of Examples 1 to 4, 3.4 parts of a mixture of o-, m-, and p-cresotic acid methyl ester and 0.6 part of a mixture of equal parts of aralkyl sulphonate and a non-ionic polyglycol ether, after addition of sulphuric acid until the pH is adjusted to 4.5, for two hours at 96–98° C. Subsequently the material is washed and dried.

EXAMPLE 7

10 parts of a fabric of polyethylene terephthalate are dyed in a bath of pH 4.5 consisting of 400 parts of water and 0.1 part of one of the finely dispersed dyestuffs of Examples 1 to 4, for two hours at 120–130° C. The fabric is then washed and dried.

EXAMPLE 8

9.5 parts of 3-aminobenzoic acid-n-butylamide are diazotised in 100 parts of water by means of 30 parts of concentrated hydrochloric acid and 34 ml. of 10 percent sodium nitrite solution at 0 to 5° C. Excess nitrous acid is destroyed in the diazonium solution and then a solution of 8.8 parts of 4-hydroxy-6-methyl-coumarin in 50 parts of pyridine and 50 parts of water added dropwise at 0 to 10° C. After stirring the mixture at room temperature for 15 hours the reaction product is filtered with suction, washed with water and dried. A yellow azo dyestuff of the following constitution is obtained:

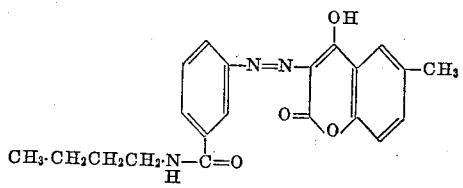

It yields on triacetate fibres strong brilliant yellow shades of good fastness to light and sublimation.

If instead of 3-aminobenzoic acid-n-butylamide the equivalent amount of 3-aminobenzoic acid-N,N-dimethylamide is used a greenish-yellow dyestuff is obtained which exhibits good dyeing properties. As coupling component 4-hydroxy-coumarin may be used in place of 4-hydroxy-6-methyl-coumarin. One obtains likewise valuable monoazo dyestuffs.

EXAMPLE 9

10.7 parts of 3-aminobenzene sulfonic acid dimethylamide are diazotised in 100 parts of water at 0 to 5° C. with 30 parts of concentrated hydrochloric acid and 35 ml. of 10 percent sodium nitrite solution. The diazonium salt solution is freed from excess nitrous acid and then, at 0 to 10° C. a solution of 8.8 parts of 4-hydroxy-6-methyl coumarin in 50 parts of pyridine and 50 parts of water added dropwise. After stirring the reaction mixture at room temperature for 15 hours the reaction product is filtered off with suction, washed with water and dried. The thus obtained yellow azo dyestuff corresponds to the formula

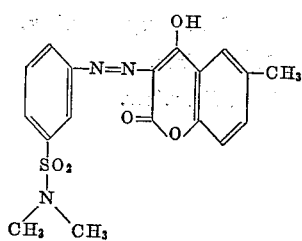

and yields on triacetate textile material strong brilliant yellow shades of very good fastness to light and sublimation.

If using instead of 3-aminobenzene sulfonic acid dimethylamide the diazo components listed below one obtains likewise yellow monoazo dyestuffs which dye triacetate fibres in the indicated shades:

| Diazo component | Shade of the dyeing on triacetate fibres |
| --- | --- |
| 1-aminobenzene-3-sulfonic acid n-butylamide | Greenish yellow. |
| 1-aminobenzene-3-sulfonic acid hydroxyethylamide | Do. |
| 1-amino-2-methoxybenzene-5-sulfonic acid methylamide | Yellow. |
| 1-amino-2-methoxybenzene-5-sulfonic acid diethylamide | Do. |
| 1-amino-2-methylbenzene-5-sulfonic acid dimethylamide | Do. |
| 1-aminobenzene-3-sulfonamide | Greenish yellow. |

Instead of 4-hydroxy-6-methyl coumarin the equivalent amounts of 4-hydroxy coumarin, 4-hydroxy-5,6-dimethyl, coumarin or 4-hydroxy-6,7-dimethyl coumarin may be used as coupling components, dyestuffs of similar dyeing properties thus being obtained.

EXAMPLE 10

10.8 parts of 3-amino-4-methoxybenzene-1-ethyl-sulfone are diazotised at 0 to 5° C. with 30 parts of concentrated hydrochloric acid, 100 parts of water and 35 parts of 10 percent sodium nitrite solution. To the diazonium salt solution is then added at 0 to 10° C. a well stirred mixture of 8.8 parts of 4-hydroxy-6-methyl coumarin, 300 parts of water and 33 parts of anhydrous soda. The suspension is stirred for further 12 hours, then filtered with suction and the press cake washed with water and dried at 80° C. One obtains the yellow dyestuff of the formula

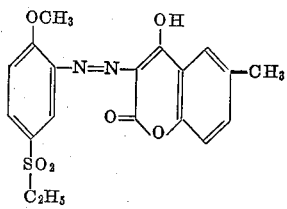

which dyes fibres from aromatic polyesters such as polyethylene terephthalates, or triacetate fibres yellow shades having good fastness to light and sublimation.

If the coupling component 4-hydroxy-6-methyl coumarin is replaced by the equivalent amount of 4-hydroxy coumarin, 4-hydroxy-5,6- or -6,7-dimethyl coumarin or the diazo component 3-amino-4-methoxybenzene-1-ethylsulfone replaced by the equivalent amount of 2-amino-4 - trifluoromethylbenzene-1-ethylsulfone dyestuffs with similar dyeing properties are producible. The sodium carbonate can be replaced by potassium carbonate.

EXAMPLE 11

11.7 parts of 2-aminodiphenylsulfone are dissolved in 150 parts of concentrated hydrochloric acid and after the addition of 100 parts of water diazotised at 0 to 5° C. with the aid of 35 parts of 10 percent sodium nitrite solution. Excess nitrous acid is removed and the diazonium salt solution freed from undissolved parts by filtering with suction. A solution of 8.8 parts of 4-hydroxy-6-methyl coumarin in 300 parts of pyridine and 300 parts of water is added dropwise at 0 to 10° C. After the suspension has been stirred at room temperature for 15 hours it is filtered with suction, washed with water an dried at 80° C. The thus obtained yellow dyestuff corresponds to the formula

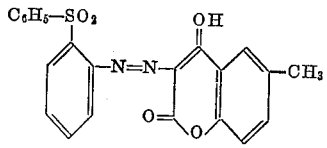

and dyes polyethylene terephthalate fibres greenish yellow shades having good fastness properties.

2-amino-diphenylsulfone may be replaced in this example by the equivalent amount of 3-amino-4-methoxydiphenylsulfone or 3-amino-4-methoxybenzene-1-benzylsulfone, and/or the 4-hydroxy-6-methyl coumarin may be replaced by the corresponding amount of 4-hydroxy coumarin; one obtains likewise valuable monoazo dyestuffs which dye polyethylene terephthalate fibres in fast shades.

We claim:
1. A dyestuff of the formula:

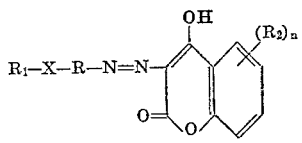

wherein:
X stands for a member selected from the class consisting of —OC— and —$O_2S$—;
R stands for phenylene, or phenylene substituted with lower alkyl, lower alkoxy, fluorine, chlorine, bromine, trifluoromethyl, or nitro;
when X is —$O_2S$—, $R_1$ means a member taken from the class consisting of lower alkyl, amino, lower alkyl substituted amino, hydroxy lower alkyl substituted amino, lower alkoxyalkyl substituted amino, phenyl, benzyl, and phenyl substituted with lower alkyl, lower alkoxy, halogen, nitro, cyano, sulfone or methyl mercapto; and
when X is —OC, $R_1$ means a member taken from the class consisting of lower alkyl, amino, lower alkyl substituted amino, hydroxy lower alkyl substituted amino, lower alkoxyalkyl, substituted amino, phenyl, benzyl, lower alkoxy, cyano substituted lower alkoxy, lower alkoxy substituted lower alkoxy, hydroxy lower alkoxy, lower alkoxy, phenyl substituted with lower alkyl, lower alkoxy, halogen, nitro, cyano, sulfone or methyl mercapto,
$R_2$ stands for a member taken from the class consisting of hydrogen, lower alkyl, fluorine, chlorine, bromine, lower alkoxy and phenyl, and
n stands for an integer ranging from 1 to 2; the dyestuff being free of sulfonic acid and carboxylic acid groups.

2. A dyestuff of the formula:

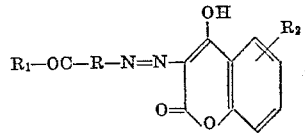

wherein $R_1$ stands for a lower alkoxy group, R stands for phenylene, or phenylene substituted with lower alkyl, lower alkoxy, fluorine, chlorine, bromine, trifluoromethyl, or nitro and $R_2$ stands for a member selected from the class consisting of hydrogen and lower alkyl; the dyestuff being free of sulfonic acid and carboxylic acid groups.

3. A dyestuff of the formula:

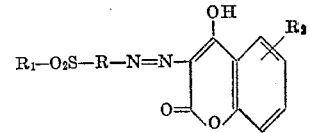

wherein $R_1$ stands for a lower alkyl group, R stands for phenylene, or phenylene substituted with lower alkyl, lower alkoxy, fluorine, chlorine, bromine, trifluoromethyl, or nitro and $R_2$ stands for a member selected from the class consisting of hydrogen and lower alkyl; the dyestuff being free of sulfonic acid and carboxylic acid groups.

4. The dyestuff of the formula

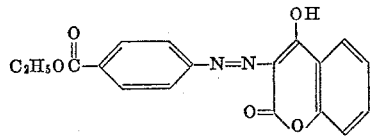

5. The dyestuff of the formula

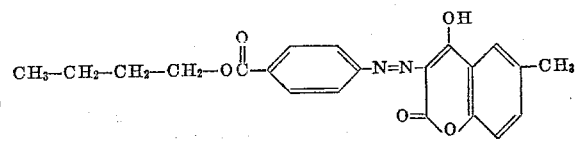

6. The dyestuff of the formula

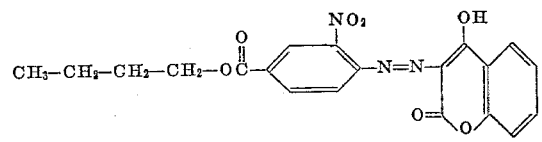

7. The dyestuff of the formula

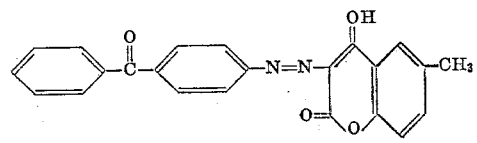

8. The dyestuff of the formula

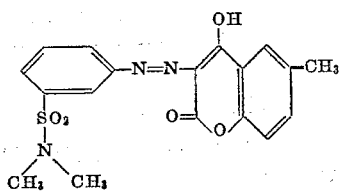

9. The dyestuff of the formula

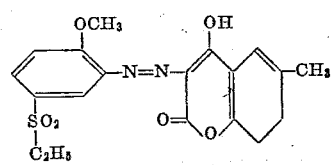

No references cited

CHARLES B. PARKER, Primary Examiner.
JOSEPH P. BRUST, Examiner.
F. D. HIGEL, Assistant Examiner.